J. M. SKINNER.
BATTERY TERMINAL.
APPLICATION FILED NOV. 16, 1912.
1,094,173.
Patented Apr. 21, 1914.
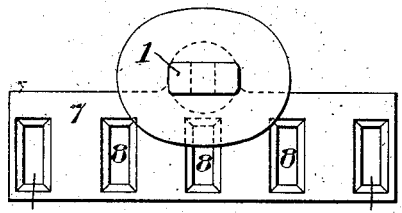
FIG. I.
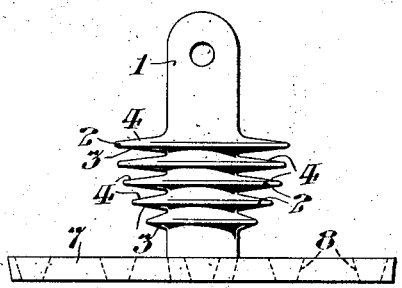
FIG. II.
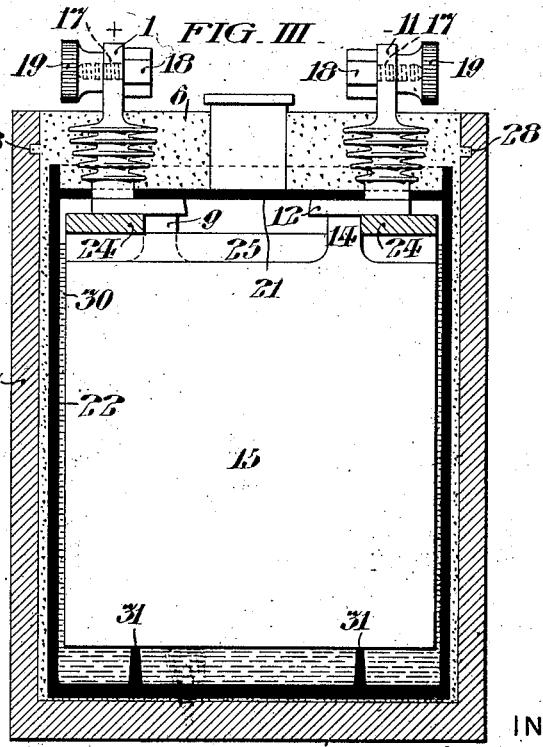
FIG. III.
WITNESSES:
Philip W. Vessey
James McCabe
INVENTOR:
James M. Skinner

UNITED STATES PATENT OFFICE.

JAMES M. SKINNER, OF PHILADELPHIA, PENNSYLVANIA.

BATTERY-TERMINAL.

1,094,173.

Specification of Letters Patent.   Patented Apr. 21, 1914.

Application filed November 16, 1912. Serial No. 731,858.

*To all whom it may concern:*

Be it known that I, JAMES M. SKINNER, of Philadelphia, in the State of Pennsylvania, have invented a certain new and useful Improvement in Battery-Terminals, whereof the following is a specification, reference being had to the accompanying drawing.

My improvement relates to terminals for batteries including electrolyte having a tendency to creep up the surface of the terminals, and may be employed with particular advantage in storage batteries including sulfuric acid electrolyte and having the terminals embedded in a sealing compound.

As hereinafter described my invention includes a battery terminal having a series of annular flanges arranged one above the other upon the vertically extending portion of the terminal so as to not only present a large extent of surface which must be traversed by the electrolyte before it reaches the top of the terminal but present such surface in a series of planes in acute angular relation with each other upon the respective flanges. Moreover, said flanges present a series of steps of upwardly increasing breadth, not only interlocking with the sealing compound extending between them, so as to offer the maximum resistance to vertical strains tending to separate said terminal and sealing compound, but opposing the maximum degree of resistance to transverse strains tending to displace the terminal with respect to the sealing compound. Furthermore, the vertical portion of said terminal is in unitary relation with a base plate having a series of sockets for the respective lugs of the battery plates; so that said lugs may be extended through said sockets and fused in homogeneous relation with said terminal.

My invention includes the various novel features of construction and arrangement hereinafter more definitely specified.

In the drawing; Figure I is a plan view of a terminal conveniently embodying my improvement, being a positive terminal, which differs from the negative terminal in that it has one less plate lug socket. Fig. II is an elevation of said terminal. Fig. III is a vertical sectional view of a storage battery provided with terminals such as shown in Figs. I and II.

In said figures, 1 is the vertically extending stem of the positive terminal having the series of elliptical annular flanges 2 presenting a large extent of surface which must be traversed by the electrolyte in creeping from the bottom to the top of said stem; said surface being presented in a series of planes 3 and 4 in respectively different acute angular relation with each other upon the respective flanges 2. It is to be particularly noted that said flanges 2 are respectively spatially distinct convolutions, as distinguished from the continuous convolutions of a screw thread; being advantageous for the purpose contemplated in that the elliptical form of said flanges 2 prevents the rotation of which a screw thread is susceptible, and the spatial distinction of said flanges eliminates the continuous spiral path for creepage of the liquid, which is afforded by a screw thread. Moreover, said flanges 2 present a series of steps of upwardly increasing breadth, not only interlocking with the sealing compound 6 extending between them as shown in Fig. III, so as to offer the maximum resistance to vertical strains tending to separate the terminals and sealing compound in which they are embedded, but opposing the maximum degree of resistance to transverse strains tending to displace the terminals with respect to said sealing compound. Said vertical portion 1 of the terminal is in unitary relation with the base plate 7 having the series of sockets 8 for the lugs 9 of the positive battery plates which are extended through said sockets and fused in homogeneous relation therewith. It is to be observed that said sockets 8 are of greater area at the top than at the bottom, as shown in Figs. I and II, thus affording access to the surfaces which are to be fused together and insuring a stronger connection than if said sockets were of the same dimensions throughout the thickness of said plate 7. The negative terminal including the vertical stem 11 is similar to the positive terminal above described except that its base plate 12 has one more socket to receive the lugs 14 of the negative plates 15. As shown in Fig. III said terminal stems 1 and 11 each have a hole 17 at the top thereof to receive electrical conductor clamping means conveniently including a bolt 18 and nut 19. As shown in Fig. III said terminal base plates 7 and 12 extend beneath the cover 21 of the battery jar 22, which is conveniently made of hard rubber compound, and are held in contact therewith by the separator hold downs 24 and separators 25, said separators resting on the jar ribs 31. Said terminals are held in the position shown in Fig. III by the sealing compound 6 which embeds them and entirely surrounds said cell 22 in engagement with the outer wooden casing 27; said compound extending in the grooves 28 of said casing as shown. It may be observed that said laterally extending base plates 7 and 12 coöperate with the annular flanges 2 on the vertically extending portions of the terminal stems 1 and 11 to retain the latter in immovable relation with the sealing compound 6 which insures that a greater resistance shall be offered to the upward passage of the electrolyte 30 than if said terminals were permitted to become loose in their engagement with said sealing compound.

I do not desire to limit myself to the precise details of construction and arrangement herein set forth as it is obvious that various modifications may be made therein without departing from the essential features of my invention as defined in the appended claims.

I claim:—

1. In a battery terminal, the combination with a vertical stem, having means at the top thereof arranged to detachably engage an electrical conductor; of a series of spatially distinct annular flanges arranged one above the other upon said stem and including a series of planes in acute angular relation with each other upon the respective flanges; said flanges presenting a series of steps of upwardly increasing breadth; and, a base plate extending transversely upon one side of said stem at the bottom thereof in unitary relation therewith and having a series of battery plate lug sockets.

2. In a battery terminal, the combination with a vertical stem; of a series of transversely extending spatially distinct annular flanges arranged one above the other upon said stem and including a series of planes in acute angular relation with each other upon the respective flanges; said flanges presenting a series of steps of upwardly increasing breadth; and, a base plate extending transversely upon said stem at the bottom thereof in unitary relation therewith and having a series of battery plate lug sockets.

3. In a battery terminal, the combination with a vertical stem; of a series of transversely extending spatially distinct annular flanges arranged one above the other upon said stem and presenting a series of steps of upwardly increasing breadth; and, a base plate extending transversely upon said stem at the bottom thereof in unitary relation therewith and having a series of battery plate lug sockets.

4. In a battery terminal, the combination with a vertical stem having means at the top thereof arranged to detachably engage an electrical conductor; of a series of spatially distinct annular flanges arranged one above the other upon said stem and including a series of planes in acute angular relation with each other upon the respective flanges; said flanges presenting a series of steps of upwardly increasing breadth.

5. In a battery terminal, the combination with a vertical stem having means at the top thereof arranged to detachably engage an electrical conductor; of a series of spatially distinct annular flanges arranged one above the other upon said stem and presenting a series of steps of upwardly increasing breadth.

6. In a battery terminal, the combination with a stem having means arranged to engage an electrical conductor; of a series of spatially distinct annular flanges on said stem forming a series of steps of outwardly increasing breadth.

7. A battery terminal formed of a unitary metal casting, including a vertical stem having opposite parallel faces and an opening therethrough at right angles to said faces, adjacent the top thereof; a series of elliptical annular flanges arranged one above the other upon said stem and each having its upper and lower surfaces in symmetrical acute angular relation with each other; said faces being at respectively different angles upon the respective flanges; said flanges presenting a series of spatial distinct steps of upwardly increasing breadth; and a base plate extending transversely upon one side of said stem at the bottom thereof, having a series of battery plate lug sockets which are of greater area at the top than at the bottom of said base plate.

In testimony whereof, I have hereunto signed my name at Philadelphia, Pennsylvania, this seventh day of November, 1912.

JAMES M. SKINNER.

Witnesses:
 JOHN S. THOMAS,
 STOCKTON H. MORTIMER.